Patented Feb. 28, 1939

2,149,249

UNITED STATES PATENT OFFICE 2,149,249

PROCESS FOR THE PRODUCTION OF AQUEOUS SOLUTIONS OF SULPHUR AND METAL SULPHIDES

Paul Nitsche, Dresden, Germany

No Drawing. Application August 17, 1937, Serial No. 159,531. In Germany January 21, 1936

3 Claims. (Cl. 252—6)

This application was filed in Germany January 21, 1936.

It is known to bring elementary sulphur into a concentrated solution with benzylamine or hydrogenated aromatic amines, such as for example cyclohexylamine, piperidine, nicotine and so forth, which solution when introduced into water separates the sulphur in colloidal form. The aqueous colloidal sulphur solutions thus obtained are suitable especially for combating animal or vegetable parasites and also for technical purposes.

These aqueous sulphur solutions have, however, the disadvantage that they contain the sulphur only in colloidal form and have only a limited durability and limited active properties.

It has now been found that the concentrated sulphur solutions obtained with benzylamine or hydrogenated aromatic amines, may be converted into dilute, aqueous true sulphur solutions applicable for practical use (cosmetics, therapeutics, combating of pests) by adding solution promoters to the diluent. Such solution promoters are selected from the group consisting of cyclohexylamine-olein soaps, the alkali salts, particularly the potash soaps, of oleic acid, fatty alcohol sulphonates, Turkey red oil and triethanolamine.

The true aqueous or alcoholic solutions obtained exhibit much higher active properties than the known colloidal sulphur solutions, in which the sulphur is not in true solution and in which it can no longer be converted into a true (correct) solution even by the addition of other solution promoters.

It has furthermore been found that it is possible in this way to convert into true aqueous solutions not only elementary sulphur but also sulphur compounds, such as sulphide or arsenic, sulphide of antimony and sulphide of selenium.

Example 1

10 parts by weight of elementary sulphur are dissolved in 45 parts by weight of cyclohexylamine and to this solution are added 45 parts by weight of an aqueous solution containing 7 parts by weight of olein and 14 parts by weight of cyclohexylamine.

The aqueous solution obtained according to Example 1 may be employed in medicine as liniments or embrocations for skin diseases, falling-out of the hair and rheumatic conditions.

Example 2

10 parts by weight of elementary sulphur are dissolved in 45 parts by weight of cyclohexylamine and 75 parts by weight of a 25% potash soap are added to the solution.

The solution prepared according to Example 2 may be employed as such or diluted with water as embrocation particularly in veterinary science or in combating plant pests as a spraying liquor, the latter if desired mixed with nicotine, pyrethrum and so forth.

Example 3

In Examples 1 and 2, it is also possible to employ sulphide of arsenic, sulphide of antimony or sulphide of selenium instead of elementary sulphur.

I claim:—

1. A process for the production of stable, true solutions of substances of the class consisting of elementary sulphur, sulphide of arsenic, sulphide of antimony and sulphide of selenium, which includes the step of introducing a concentrated solution of a substance of the aforesaid class in a solvent selected from the group consisting of benzylamine and hydrogenated cyclic amines into an aqueous solution containing a solution promoter selected from the group consisting of cyclo-hexyl-amine-olein soaps, the alkali salts of oleic acid, fatty alcohol sulphonates, Turkey red oil, and triethanolamine.

2. Stable, true solutions of substances of the class consisting of elementary sulphur, sulphide of arsenic, sulphide of antimony and sulphide of selenium soluble in a solvent of the group consisting of benzylamine and hydrogenated cyclic amines, the said solution comprising water, a substance of the aforesaid class, a solvent of the aforesaid group, and a solution promoter selected from the group consisting of cyclo-hexyl-amine-olein soaps, the alkali salts of oleic acid, fatty alcohol sulphonates, Turkey red oil, and triethanolamine.

3. A stable, true solution of elementary sulphur consisting of water, elementary sulphur, cyclo-hexyl-amine and olein.

PAUL NITSCHE.